United States Patent [19]

Tighe

[11] 4,197,272

[45] Apr. 8, 1980

[54] CATALYTIC EXHAUST SYSTEM

[75] Inventor: Brian Tighe, Birmingham, England

[73] Assignee: BL Cars Limited, Birmingham, England

[21] Appl. No.: 651,135

[22] Filed: Jan. 21, 1976

Related U.S. Application Data

[60] Division of Ser. No. 477,536, Jun. 7, 1974, abandoned, which is a continuation-in-part of Ser. No. 417,281, Nov. 19, 1973, abandoned.

[30] Foreign Application Priority Data

Nov. 23, 1972 [GB] United Kingdom ............... 54133/72

[51] Int. Cl.$^2$ .............................................. B01J 8/02
[52] U.S. Cl. ..................................... 422/180; 60/299; 252/426; 252/428; 252/430; 422/177
[58] Field of Search ....................... 252/430, 426, 428; 23/288 F; 422/180, 177; 60/299

[56] References Cited

U.S. PATENT DOCUMENTS

| 2,929,792 | 3/1960 | Arnold et al. ..................... 252/430 |
| 3,479,300 | 11/1969 | Rivin et al. ..................... 252/430 |
| 3,515,677 | 6/1970 | Pochowicz ..................... 252/430 |
| 3,617,506 | 11/1971 | Cole et al. ..................... 252/430 X |
| 3,671,591 | 6/1972 | Schwager et al. ............... 252/430 X |
| 3,773,894 | 11/1973 | Bernstein et al. ................ 423/213.5 |

*Primary Examiner*—Patrick Garvin
*Attorney, Agent, or Firm*—Brisebois & Kruger

[57] ABSTRACT

A catalytic device for the decomposition of nitric oxide comprises a highly conjugated polymer possessing a high concentration of free electrons on sites of the catalyst. In a preferred form, for use in automobile engine exhausts, the polymer is pyrolized polyacrylonitrile.

8 Claims, No Drawings

CATALYTIC EXHAUST SYSTEM

This is a division, of application Ser. No. 477,536, filed June 7, 1974, and now abandoned, which was itself a continuation-in-part of Ser. No. 417,281, filed Nov. 19, 1973, and now abandoned.

This invention relates to catalytic processes. The invention is particularly concerned with the treatment of gas flows containing nitric oxide in which a catalyst or catalyst are used to decompose the nitric oxide.

Internal combustion engines (both of compression and spark ignition types) provide exhaust gases which contain three constituents which are considered to be major atmospheric pollutants. These are carbon monoxide, unburnt hydrocarbons and oxides of nitrogen. A number of countries have either imposed, or proposed the introduction of, legislation covering both the maximum permitted levels of such pollutants as well as the methods by which the levels are to be measured. Whereas carbon monoxide and unburnt hydrocarbons may be readily controlled: by the use of catalytic converters, exhaust manifold reactors or exhaust recirculation; the control of nitric oxide levels presents a more difficult problem. Typically one limitation arises in that systems providing for the decomposition of nitric oxide require a reducing, as distinct from an oxidising, atmosphere. This conflicts with the need for the oxidising atmosphere generally considered necessary for the control of carbon monoxide and unburnt hydrocarbons.

According to one aspect of the present invention a catalytic device for insertion in a gas flow path incorporates a catalyst for nitric oxide decomposition including a highly conjugated polymer possessing a high concentration of free electrons on sites of the catalyst. It would appear that the sites concerned are those corresponding to the theoretical concept of active sites.

According to a second aspect of the present invention a method of treating exhaust gases from an internal combustion engine for nitric oxide decomposition comprises passing the exhaust gases into contact with a catalyst comprising or including a highly conjugated polymer possessing a high concentration of free electrons on sites of the catalyst.

According to a third aspect of the present invention an exhaust system for internal combustion engines includes a catalytic device adapted to receive exhaust gases from the engine the catalytic device incorporates as a catalyst a highly conjugated polymer possessing free electrons on sites of the catalyst for nitric acid decomposition.

According to a fourth aspect of the present invention a catalyst for any previous aspect of the invention comprises pyrolysed polyacrylonitrile or copolymers of acrylonitrile.

According to a fifth aspect of the present invention a catalyst according to the first, second or third aspects of the invention comprises pyrolised polyacrylonitrile (or copolymers thereof) with the addition of a comonomer in proportion of 0.1 to 5.0% by weight selected from the group consisting of:
vinyl chloride, styrene vinylacetate, isobutylene, acrylic acid, acrylates, 2-vinyl pyridine, 2-methyl-5 vinyl pyridine, N-vinyl pyrrolidane, diethylaminoethyl methacrylate, vinylidene chloride.
The purpose of the comonomer is to modify the fibre-like properties of polyacrylonitrile.

According to a sixth aspect of the present invention a catalyst according to any previous aspect of the invention is mixed with a metal, or oxide of a metal, selected from the group consisting of: iron, cobalt, nickel, copper, chromium, vanadiummolybdenum, manganese and platinum. Typically the mixture could comprise polyacrylonitrile on alumina granules mixed with platinum on alumina granules.

Polymers having highly conjugated structures possess the unique property of forming at their surface, and throughout their bulk, suitable structural regions having high concentrations of free electrons. These high concentrations of free electrons are known to be formed when the parent polymer is heated. The amount of heat required (principally in terms of temperature but also in terms of time) is characteristic of the chemical nature of the parent polymer but a range of acceptable heat treatments appears to be available in most known cases. The free electron concentration increases with increasing predetermined temperature until a limiting temperature is reached beyond which the concentration begins to decrease. The achievement of this limiting temperature is frequently accompanied by cross linking and eventual thermal decomposition of the polymer.

The affinity of nitric oxide for free electrons has been known for some time and has given rise to the use of nitric oxide as a radical scavenger in chemical reactions. The present invention involves the use of a highly conjugated polymer possessing high concentrations of free electrons as a catalytic surface for the decomposition of nitric oxide. The catalytic activity arises as a direct consequence of the high affinity which nitric oxide has for free electrons and for surfaces of this type.

A preferred polymer is pyrolysed polyacryloritrile which is conveniently prepared and provides a very active catalyst for the decomposition of nitric oxide. Good results have been obtained with a commercial product marketed by Monsanto Limited. The molecular weight range of useful polyacrylonitriles lies between 30,000 and 1,000,000 and particularly in the range 50,000 to 300,000.

Although branched polymers form an active catalyst on pyrolysis a substantially linear polymer is necessary in order to achieve solubility in dimethylformamide and thereby the ability to apply the catalyst to the support. The polymers used are substantially linear white powders having a molecular weight in the region of 100,000. The polymer is not cross-linked at this stage that is to say prior to deposition on the support.

Two examples of polyacrylonitrile were prepared for use for the catalytic decomposition of nitric oxide as follows:

EXAMPLE 1.

2 grm of polyacrylonitrile dissolved in 15 grm dimethylformamide were deposited on 25 grm of alumina granules by a solvent evaporation technique. The polymer coated granules were heated to 250° C. for 24 hours under vacuum immediately followed by heating at 400° C. for 2 hours under vacuum to convert the polyacrylonitrile into a highly conjugated pyrolysed form. Subsequent heat treatment at 600° C. was carried out and the resulting granules were examined by means of an electron spin resonance spectroscopy and showed a high free electron concentration throughout the structure.

EXAMPLE 2

A solution of polyacrylonitrile was applied to a ceramic honeycomb matrix support and solvent evaporated to give a coherent film of polymer on the surface of the support. The coated support was heated in an atmosphere of nitrogen at a temperature of 400° C. to convert the polymer to a thermally stable pyrolysed form. The final heat treatment at 600° C. was applied and the matrix was then ready to use.

In general concentrations from 4–25% by weight of polyacylonitrile in dimethyl formamide have given acceptable support granule coating. In both of the above examples, and probably also in the cases of the other materials referred to, the conversion of the parent polymer to a suitable form involves two steps; one of providing a highly conjugated structure, typically in the above example by pyrolisis, and secondly by increasing the free electron concentration.

These points are illustrated by the following results.

A catalyst was prepared, as described in Example 1 on a pelleted alumina support. The efficiency of the catalyst in decomposing nitric oxide (according to the equation $2NO \rightarrow N_2 + O_2$) was investigated.

Nitric oxide in nitrogen (6,000 parts per million) was passed through the catalyst bed at various temperatures and space velocities. The percentage of nitric oxide removed by the catalyst is indicated below.

| CATALYST BED TEMPERATURE | SPACE VELOCITY (hours$^{-1}$) | NITRIC OXIDE REMOVAL (%) |
|---|---|---|
| 590 | 3,850 | 89–95 |
| 620 | 3,850 | 93–99 |
| 670 | 12,000 | 86–92 |
| 700 | 12,000 | 93–99 |

A catalyst was similarly prepared on a pelleted silica support and examined for catalytic efficiency with a mixture of nitric oxide (3,300 parts per million) and carbon monoxide (40,000 parts per million).

| CATALYST BED TEMPERATURE (°C.) | SPACE VELOCITY (hours$^{-1}$) | NITRIC OXIDE REMOVAL (%) | CARBON MONOXIDE REMOVAL (%) |
|---|---|---|---|
| 560 | 1,850 | 91–99 | 5.0(±2) |
| 600 | 1,850 | 90–98 | 5.5(±2) |
| 600 | 12,000 | 90–98 | 5.5(±2) | the same catalyst with nitric oxide (6,000 parts per million) but no carbon monoxide gave the following result

| CATALYST BED TEMPERATURE (°C.) | SPACE VELOCITY (hours$^{-1}$) | NITRIC OXIDE REMOVAL (%) | CARBON MONOXIDE REMOVAL (%) |
|---|---|---|---|
| 600 | 2,000 | 90–95 | — |

These results suggest that the reactions $2NO \rightleftharpoons N_2 + O_2$ and $2CO + 2NO \rightleftharpoons N_2 + 2CO_2$ both take place.

Tests have shown that polyacrylonitrile prepared in the described way catalyses the thermal decomposition of nitric oxide to nitrogen and oxygen even in the presence of small amounts of oxygen. It also has a beneficial effect in the reduction of carbon monoxide and unburnt hydrocarbon concentration.

Polymers which possess the property of forming structures of high free electron concentration are known and would seem to offer similar benefits to those provided by polyacrylonitrile. Other examples of this type of polymer are:

polybenzimidazoles, polyacenequinones, polyimines, polydiphenyldiacetylenes, polymeric metal phthalocyanine complexes, polyindoloindazoles, polypyromellitimides, polyphenylene.

We claim:

1. An exhaust system for an internal combustion engine which contains a catalytic device in the exhaust gas flow path of said engine, said catalytic device comprising a catalyst carrier on which is provided a catalyst for the decomposition of nitric oxide comprising a highly conjugated polymer possessing a high concentration of free electrons on sites of the catalyst.

2. The exhaust system of claim 1 wherein the catalyst comprises pyrolysed polyacrylonitrile or copolymers of acrylonitrile.

3. The exhaust system of claim 2 with the addition of a comonomer, in proportion of 0.1 to 5.0% by weight, selected from the group consisting of vinyl chloride, styrene, vinyl acetate, isobutylene, acrylic acid, acrylates, 2-vinyl pyridine, 2-methyl -5 vinyl pyridine, N-vinyl pyridine, dimethyl aminoethyl methacrylate, vinylidene chloride.

4. The exhaust system of claim 2 with the addition of a metal, or oxide of a metal, selected from the group consisting of: iron, cobalt, nickel, copper, chromium, vanadium, molybdenum, manganese and platinum.

5. The exhaust system of claim 1 wherein the catalyst comprises one of the following polymers: polybenzimidazoles, polyacenequinones, polyimines, polydiphenyldiacetylenes, polymeric metal phthalocyanine complexes, polyindoloinidazoles, pyrolysed polyacrylonitrile, polypyromellitimides, polyphenylene.

6. The exhaust system of claim 1 wherein the catalyst is deposited onto granules of alumina.

7. The exhaust system of claim 1 wherein the catalyst is deposited onto granules of alumina and silica where the silica content proportion is 0.02% or less by weight.

8. The exhaust system of claim 1 wherein the catalyst is deposited onto a ceramic honeycomb matrix support.

* * * * *